(12) United States Patent
Nagata

(10) Patent No.: US 7,370,041 B2
(45) Date of Patent: May 6, 2008

(54) INFORMATION PROCESSING METHOD, INFORMATION PROCESSING SYSTEM, INFORMATION REGISTRATION APPARATUS, INFORMATION ACQUISITION APPARATUS, AND COMPUTER MEMORY PRODUCT

(75) Inventor: Yoshinori Nagata, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 413 days.

(21) Appl. No.: 10/443,093

(22) Filed: May 22, 2003

(65) Prior Publication Data
US 2003/0220904 A1 Nov. 27, 2003

(30) Foreign Application Priority Data
May 23, 2002 (JP) ............................. 2002-149785

(51) Int. Cl.
G06F 17/30 (2006.01)
(52) U.S. Cl. .................... 707/4; 707/1; 707/2; 707/3
(58) Field of Classification Search .............. 707/1–5
See application file for complete search history.

(56) References Cited

U.S. PATENT DOCUMENTS

| 6,507,841 | B2 * | 1/2003 | Riverieulx de Varax | 707/5 |
| 2001/0029507 | A1 * | 10/2001 | Nojima | 707/102 |
| 2002/0040289 | A1 * | 4/2002 | Ohashi | 703/22 |
| 2002/0167947 | A1 * | 11/2002 | Halford et al. | 370/390 |
| 2004/0162842 | A1 * | 8/2004 | Ono et al. | 707/100 |

FOREIGN PATENT DOCUMENTS

| CN | 1299203 A | 6/2001 |
| JP | 10-187517 | 7/1998 |
| JP | 10-307745 | 11/1998 |
| JP | 11-085578 | 3/1999 |

OTHER PUBLICATIONS

Chinese Office Action mailed Jun. 3, 2005 in corresponding Chinese application No. 03141009.X.

* cited by examiner

Primary Examiner—Apu Mofiz
Assistant Examiner—CamLinh Nguyen
(74) Attorney, Agent, or Firm—Nixon & Vanderhye PC

(57) ABSTRACT

An information acquisition apparatus receives summary information and displays the outline information included in the summary information. When a document information acquisition request is given, the information acquisition apparatus determines, based on the current date and time and the validity period information included in the summary information, whether or not the document information corresponding to the received summary information is within its validity period. When it is within the validity period, the information acquisition apparatus acquires the corresponding document information from a databases in an information management apparatus. When it is outside the validity period, the information acquisition apparatus creates and transmits a communication document to an information registration apparatus that registered the document information. It is possible to easily understand the outline of the document information and promptly contact the registrant of the document information by electronic mail or other means.

15 Claims, 17 Drawing Sheets

FIG. 6

| |
|---|
| TOTAL PAGE NUMBER (M) |
| NUMBER OF OBJECT (N1) |
| KIND OF OBJECT 1-1 |
| POSITION OF OBJECT 1-1 |
| SIZE OF OBJECT 1-1 |
| LINE WIDTH OF OBJECT 1-1 |
| DATA OF OBJECT 1-1 |
| ⋮ |
| KIND OF OBJECT 1-N1 |
| POSITION OF OBJECT 1-N1 |
| SIZE OF OBJECT 1-N1 |
| LINE WIDTH OF OBJECT 1-N1 |
| DATA OF OBJECT 1-N1 |
| ⋮ |
| NUMBER OF OBJECT (NM) |
| KIND OF OBJECT M-1 |
| POSITION OF OBJECT M-1 |
| SIZE OF OBJECT M-1 |
| LINE WIDTH OF OBJECT M-1 |
| DATA OF OBJECT M-1 |
| ⋮ |
| KIND OF OBJECT M-NM |
| POSITION OF OBJECT M-NM |
| SIZE OF OBJECT M-NM |
| LINE WIDTH OF OBJECT M-NM |
| DATA OF OBJECT M-NM |

Rows 2–7 constitute the 1st PAGE (through row 13); rows 14–25 constitute the Mth PAGE.

FIG. 13

| E-mail Add. of REGISTRANT | FIXED-EXPRESSION |
|---|---|
| "*.co.jp" | FIXED-EXPRESSION 1 |
| "*@xy.co.jp" | FIXED-EXPRESSION 2 |
| "yamada@abcprovider.or.jp" | FIXED-EXPRESSION 3 |

Dear {REGISTRANT}

Please be informed the file " {DOCUMENT NAME} "
you sent to us expired on {VALIDITY PERIOD}.
Kindly send the latest " {DOCUMENT NAME} "
as soon as possible.

XY corporation. Tanaka Ichiro (tanaka@xy.co.jp)

FIG. 16

| P11: TO CREATE SUMMARY INFORMATION INCLUDING OUTLINE INFORMATION CONTAINING A PART OF REGISTERED DOCUMENT INFORMATION, LOCATION INFORMATION INDICATING ANOTHER COMPUTER IN WHICH DOCUMENT INFORMATION IS TO BE REGISTERED AND REGISTRATION LOCATION IN THIS COMPUTER, AND REGISTRANT INFORMATION SHOWING INFORMATION SPECIFYING APPARATUS THAT REGISTERED DOCUMENT INFORMATION |
|---|
| P12: TO TRANSMIT CREATED SUMMARY INFORMATION TO OTHER COMPUTER |
| P13: TO ACCEPT VALIDITY PERIOD INFORMATION SHOWING TIME LIMIT WITHIN WHICH REGISTERED DOCUMENT INFORMATION IS ACQUIRABLE |
| P14: TO ADD ACCEPTED VALIDITY PERIOD INFORMATION TO SUMMARY INFORMATION |

28

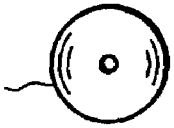

| |
|---|
| P21: TO RECEIVE SUMMARY INFORMATION INCLUDING OUTLINE INFORMATION CONTAINING A PART OF DOCUMENT INFORMATION TO BE ACQUIRED, LOCATION INFORMATION INDICATING APPARATUS IN WHICH DOCUMENT INFORMATION IS REGISTERED AND REGISTRATION LOCATION IN APPARATUS, REGISTRANT INFORMATION SHOWING INFORMATION SPECIFYING AN APPARATUS THAT REGISTERED DOCUMENT INFORMATION AND VALIDITY PERIOD INFORMATION SHOWING TIME LIMIT WITHIN WHICH DOCUMENT INFORMATION IS ACQUIRABLE |
| P22: TO CREATE COMMUNICATION DOCUMENT TO BE TRANSMITTED TO APPARATUS THAT REGISTERED DOCUMENT INFORMATION CORRESPONDING TO RECEIVED SUMMARY INFORMATION |
| P23: TO TRANSMIT THE CREATED COMMUNICATION DOCUMENT, ACCORDING TO REGISTRANT INFORMATION INCLUDED IN SUMMARY INFORMATION CORRESPONDING TO COMMUNICATION DOCUMENT |
| P24: TO DETERMINE, BASED ON VALIDITY PERIOD INFORMATION INCLUDED IN RECEIVED SUMMARY INFORMATION, WHETHER OR NOT DOCUMENT INFORMATION CORRESPONDING TO RECEIVED SUMMARY INFORMATION IS ACQUIRABLE |
| P25: TO INSERT FIXED-EXPRESSION INTO COMMUNICATION DOCUMENT WHEN CREATING COMMUNICATION DOCUMENT |
| P26: TO JUDGE INFORMATION INCLUDED IN RECEIVED SUMMARY INFORMATION BY CONDITIONAL EXPRESSIONS WHEN CREATING COMMUNICATION DOCUMENT |
| P27: TO SELECT ANY OF A PLURALITY OF FIXED-EXPRESSIONS ACCORDING TO RESULT OF JUDGEMENT AND INSERT SELECTED FIXED-EXPRESSION INTO COMMUNICATION DOCUMENT |
| P28: TO INSERT PHRASE EXTRACTED FROM RECEIVED SUMMARY INFORMATION INTO PREDETERMINED PORTION WHEN CREATING COMMUNICATION DOCUMENT |
| P29: TO CREATE COMMUNICATION DOCUMENT WHEN IT IS DETERMINED THAT DOCUMENT INFORMATION CORRESPONDING TO RECEIVED SUMMARY INFORMATION IS OUTSIDE VALIDITY PERIOD |

INFORMATION PROCESSING METHOD, INFORMATION PROCESSING SYSTEM, INFORMATION REGISTRATION APPARATUS, INFORMATION ACQUISITION APPARATUS, AND COMPUTER MEMORY PRODUCT

BACKGROUND OF THE INVENTION

1. Field of the Invention

The present invention relates to an information processing method, an information processing system, an information registration apparatus, an information acquisition apparatus, and a computer memory product. More specifically, the present invention relates to an information processing method for registering electronic document information (hereinafter simply referred to as the document information) in a database such as a server computer or the like and then distributing the document information; an information processing system for the information processing method; an information registration apparatus and an information acquisition apparatus that are components of such an information processing system; and a computer-readable medium (computer memory product) storing computer programs for realizing the functions of the information registration apparatus and information acquisition apparatus by a general-purpose computer.

2. Description of Related Art

With the recent IT (Information Technology) development, an increasing number of document information is being created, and a variety of information processing systems for efficiently registering such document information and for distributing the registered document information have been put into practical use.

A general example of the information processing systems for registering and distributing document information is a system in which a server computer (hereinafter referred to as the server) which stores and manages document information is connected to a communication network such as a LAN or the Internet, an information registrant registers document information in the server, and an information user acquires document information into a client computer from the server.

However, with the above system using the server, the processing load on the server becomes heavier as the data volume of the document information managed by the server increases. An invention was proposed in view of such a circumstance, and, as disclosed in Japanese Patent Application Laid-Open No. 11-85578 (1999), this invention sets a condition for eliminating documents, such as the validity period or number of registered documents, in the server, compares the registered document information with such the condition for eliminating document, and eliminates document information satisfying the condition. With such a construction, the data volume managed by the server can always be kept within the processing ability of the server.

Moreover, when the information volume of individual pieces of document information increases, it needs a long time to understand the content of each piece of document information. Then, an invention was proposed, and, as disclosed in Japanese Patent Application Laid-Open No. 10-307745 (1998), this invention causes a server to generate a reference image of document information and uses this reference image as means for knowing the outline of an individual piece of document information.

However, it is not always the case that the reference image as disclosed in the above-mentioned invention of Japanese Patent Application Laid-Open No. 10-307745 (1998) contains information showing the name or mail address of the information registrant. Therefore, when an information user who views the reference image wishes to make an inquiry about the document information, this user faces the problem that he/she can not contact the information registrant.

Besides, even if the information user can contact the information registrant, the information user needs to let the information registrant know his/her desired document information among a plurality of pieces of document information registered by the information registrant. In order to specify document information, the document registrant must be extractable from the reference image.

In addition, when document information registered in the server was eliminated by a method as disclosed in the above Japanese Patent Application Laid-Open No. 11-85578 (1999), the information concerning the document information does not exist in the server, and the information user faces the problem that he/she can not acquire the document information but wastes time and money to trying to acquire the document information.

BRIEF SUMMARY OF THE INVENTION

The present invention has been made with the aim of solving the above problems, and it is a principle object of the present invention to provide an information processing method and an information processing system, capable of creating summary information including an outline of document information, location information indicating an apparatus in which the document information is registered and the stored location in the apparatus, and registrant information of the document information, thereby enabling an information user (recipient) who received the summary information to easily contact the registrant of the document information, and further capable of adding validity period information of the document information to the summary information, thereby enabling a document acquisition apparatus that received the summary information to determine whether or not the document information is present in an information management apparatus, in other words, whether or not the document information is acquirable.

It is also an object of the present invention to provide an information registration apparatus, an information acquisition apparatus, and a recording medium (computer memory product) storing computer programs for them, constituting the above-mentioned information processing system.

According to a first aspect of the information processing method of the present invention, there is provided an information processing method for allowing an information acquisition apparatus to receive and acquire document information being registered in an information management apparatus to which document information is transmitted from an information registration apparatus, comprising the steps of creating, by the information registration apparatus, summary information including outline information containing a part of document information registered in the information management apparatus, location information indicating the information management apparatus in which the document information is registered and a registration location in the information management apparatus, and registrant information specifying itself; transmitting, by the information registration apparatus, the summary information to the information acquisition apparatus; receiving, by the information acquisition apparatus, the summary information from the information registration apparatus; creating, by the information acquisition apparatus, a communication document to be transmitted to the information registration apparatus that transmitted the received summary information; and transmitting, by the information acquisition apparatus, the created communication document according to the registrant information included in the summary information corresponding to the communication document.

In the first aspect of such an information processing method of the present invention, an information registration apparatus creates summary information including outline information containing a part of document information registered in the information management apparatus, location information indicating the information management apparatus in which the document information is registered and the registration location in the information management apparatus, and registrant information specifying itself, and then transmits the summary information to an information acquisition apparatus. The information acquisition apparatus receives the summary information from the information registration apparatus, creates a communication document to be transmitted to the information registration apparatus that transmitted the received summary information, and transmits the created communication document, according to the registrant information included in the summary information corresponding to the communication document.

According to a second aspect of the information processing method of the present invention, there is provided an information processing method based on the first aspect, further comprising the steps of accepting, by the information registration apparatus, validity period information showing a time limit within which the document information registered in the information management apparatus is acquirable; adding, by the information registration apparatus, the accepted validity period information to the summary information; and determining, by the information acquisition apparatus, based on the validity period information included in the summary information received from the information registration apparatus, whether or not the document information is acquirable from the information management apparatus.

In the second aspect of such an information processing method of the present invention, in addition to the first aspect, the information registration apparatus accepts validity period information showing a time limit within which the document information registered in the information management apparatus is acquirable and adds the accepted validity period information to the summary information, and the information acquisition apparatus determines, based on the validity period information included in the summary information received from the information registration apparatus, whether or not the document information is acquirable from the information management apparatus.

Further, according to a third aspect of the information processing method of the present invention, there is provided an information processing method based on the second aspect, further comprising the step of creating and transmitting, by the information registration apparatus, a communication document when it is determined that the document information corresponding to the received summary information is outside the validity period.

In the third aspect of such an information processing method of the present invention, in addition to the second aspect, the information registration apparatus creates and transmits a communication document when it is determined that the document information corresponding to the received summary information is outside the validity period.

According to a first aspect of the information processing system of the present invention, there is provided an information processing system including an information management apparatus, an information registration apparatus for transmitting and registering document information into the information management apparatus, and an information acquisition apparatus for receiving and acquiring document information from the information management apparatus, wherein the information registration apparatus comprises: summary information creating means for creating summary information including outline information containing a part of document information registered in the information management apparatus, location information indicating the information management apparatus in which the document information is registered and a registration location in the information management apparatus, and registrant information specifying itself; and summary information transmitting means for transmitting the summary information created by the summary information creating means to the information acquisition apparatus, and the information acquisition apparatus comprises: summary information receiving means for receiving the summary information from the information registration apparatus; communication document creating means for creating a communication document to be transmitted to the information registration apparatus that transmitted the summary information received by the summary information receiving means; and communication document transmitting means for transmitting the communication document created by the communication document creating means, according to the registrant information included in the summary information corresponding to the communication document.

In the first aspect of such an information processing system of the present invention, in the information registration apparatus, the summary information creating means creates summary information including outline information containing a part of document information registered in the information management apparatus, location information indicating the information management apparatus in which the document information is registered and the registration location in the information management apparatus, and registrant information specifying itself, and then the summary information transmitting means transmits the summary information to the information acquisition apparatus. Meanwhile, in the information acquisition apparatus, the summary information receiving means receives the summary information from the information registration apparatus; the communication document creating means creates a communication document to be transmitted to the information registration apparatus that transmitted the summary information received by the summary information receiving means; and the communication document transmitting means transmits the communication document, according to the registrant information included in the summary information corresponding to the communication document.

Moreover, according to a second aspect of the information processing system of the present invention, there is provided an information processing system based on the first aspect, wherein the information registration apparatus further comprises means for accepting validity period information showing a time limit within which the document information registered in the information management apparatus is acquirable, the summary information creating means further comprises means for adding the accepted validity period information to the summary information, and the information acquisition apparatus further comprises determining means for determining, based on the validity period information included in the summary information received by the summary information receiving means, whether or not the document information is acquirable from the information management apparatus.

In the second aspect of such an information processing system of the present invention, in addition to the first aspect of the information processing system, the information registration apparatus accepts the validity period information showing a time limit within which the document information registered in the information management apparatus is acquirable, the summary information creating means adds the accepted validity period information to the summary information, and the information acquisition apparatus determines, based on the validity period information included in the summary information received by the summary information receiving means, whether or not the document information is acquirable from the information management apparatus.

Further, according to a third aspect of the information processing system of the present invention, there is provided an information processing system based on the second aspect, wherein the information acquisition apparatus further comprises fixed-expression storing means for storing fixed-expressions, and when creating a communication document, the communication document creating means inserts a fixed-expression stored in the fixed-expression storing means into the communication document.

In the third aspect of such an information processing system of the present invention, in addition to the second aspect of the information processing system, in the information acquisition apparatus, when creating a communication document, the communication document creating means inserts a fixed-expression stored in the fixed-expression storing means into the communication document.

Besides, according to a fourth aspect of the information processing system of the present invention, there is provided an information processing system based on the third aspect of the information processing system, wherein the information acquisition apparatus further comprises means for storing conditional expressions, and when creating a communication document, the communication document creating means judges the information included in the summary information received by the summary information receiving means by the conditional expressions, selects a fixed-expression stored in the fixed-expression storing means, according to a result of the judgment, and inserts the fixed-expression into the communication document.

In the fourth aspect of such an information processing system of the present invention, in addition to the third aspect of the information processing system, in the information acquisition apparatus, when creating a communication document, the communication document creating means judges the information included in the summary information received by the summary information receiving means by the conditional expressions, selects a fixed-expression stored in the fixed-expression storing means, according to a result of the judgment, and inserts the fixed-expression into the communication document.

According to a fifth aspect of the information processing system of the present invention, there is provided an information processing system based on the fourth aspect, wherein a fixed-expression to be stored in the fixed-expression storing means has an insertion portion into which a phrase can be inserted by the communication document creating means, and when creating a communication document, the communication document creating means inserts a phrase extracted from the summary information received by the summary information receiving means into the insertion portion of the fixed-expression.

In the fifth aspect of such an information processing system of the present invention, in addition to the fourth aspect of the information processing system, when creating a communication document, the communication document creating means inserts a phrase extracted from the summary information received by the summary information receiving means into the insertion portion of the fixed-expression.

In addition, according to a sixth aspect of the information processing system of the present invention, there is provided an information processing system based on the fifth through eighth aspects, wherein the communication document creating means creates a communication document when the determining means determines that the document information corresponding to the received summary information is outside the validity period.

In the sixth aspect of such an information processing system of the present invention, in addition to the fifth aspect of the information processing system, the communication document creating means creates a communication document when the determining means determines that the document information corresponding to the received summary information is outside the validity period.

According to a first aspect of the information registration apparatus of the present invention, there is provided an information registration apparatus for transmitting and registering document information into an information management apparatus, comprising: summary information creating means for creating summary information including outline information containing a part of document information registered in the information management apparatus, location information indicating the information management apparatus in which the document information is registered and a registration location in the information management apparatus, and registrant information specifying itself; and summary information transmitting means for transmitting the summary information created by the summary information creating means.

In the first aspect of such an information registration apparatus of the present invention, the summary information creating means creates summary information including outline information containing a part of document information registered in the information management apparatus, location information indicating the information management apparatus in which the document information is registered and the registration location in the information management apparatus, and registrant information specifying itself; and then the summary information transmitting means transmits the summary information.

Moreover, according to a second aspect of the information registration apparatus of the present invention, there is provided an information registration apparatus based on the first aspect of the information registration apparatus, further comprising means for accepting validity period information showing a time limit within which the document information registered in the information management apparatus is acquirable, wherein the summary information creating means further comprises means for adding the accepted validity period information to the summary information.

In the second aspect of such an information registration apparatus of the present invention, in addition to the first aspect of the information registration apparatus, validity period information showing a time limit within which the document information registered in the information management apparatus is acquirable is accepted, and the summary information creating means adds the accepted validity period information to the summary information.

According to a first aspect of the information acquisition apparatus of the present invention, there is provided an information acquisition apparatus for receiving and acquiring document information, comprising: summary information receiving means for receiving summary information including outline information containing a part of document information to be acquired, location information indicating an apparatus in which the document information is registered and a registration location in the apparatus, registrant information showing information specifying an apparatus that registered the document information; and validity period information showing a time limit within which the document information is acquirable; communication document creating means for creating a communication document to be transmitted to the apparatus that transmitted the summary information received by the summary information receiving means; and communication document transmitting means for transmitting the communication document created by the communication document creating means, according to the registrant information included in the summary information corresponding to the communication document.

In the first aspect of such an information acquisition apparatus of the present invention, the summary information receiving means receives summary information including outline information containing a part of document information to be acquired, location information indicating an apparatus in which the document information is registered and the registration location in the apparatus, registrant information showing information specifying an apparatus that registered the document information, and validity period information showing a time limit within which the document information is acquirable, the communication document creating means creates a communication document to be transmitted to the apparatus that transmitted the summary information, and the communication document transmitting means transmits the communication document, according to the registrant information included in the summary information corresponding to the communication document.

Moreover, according to a second aspect of the information acquisition apparatus of the present invention, there is provided an information acquisition apparatus based on the first aspect, further comprising determining means for determining, based on the validity period information included in the summary information received by the summary information receiving means, whether or not the document information corresponding to the received summary information is acquirable.

In the second aspect of such an information acquisition apparatus of the present invention, in addition to the first aspect of the information acquisition apparatus, it is determined, based on the validity period information included in the summary information received by the summary information receiving means, whether or not the document information corresponding to the received summary information is acquirable.

Further, according to a third aspect of the information acquisition apparatus of the present invention, there is provided an information acquisition apparatus based on the second aspect of the information acquisition apparatus, further comprising fixed-expression storing means for storing fixed-expressions, wherein, when creating a communication document, the communication document creating means inserts a fixed-expression stored in the fixed-expression storing means into the communication document.

In the third aspect of such an information acquisition apparatus of the present invention, in addition to the second aspect of the information acquisition apparatus, when creating a communication document, the communication document creating means inserts a fixed-expression stored in the fixed-expression storing means into the communication document.

Additionally, according to a fourth aspect of the information acquisition apparatus of the present invention, there is provided an information acquisition apparatus based on the third aspect of the information acquisition apparatus, further comprising means for storing conditional expressions, wherein, when creating a communication document, the communication document creating means judges the information included in the summary information received by the summary information receiving means by the conditional expressions, selects a fixed-expression stored in the fixed-expression storing means, according to a result of the judgment, and inserts the fixed-expression into the communication document.

In the fourth aspect of such an information acquisition apparatus of the present invention, in addition to the third aspect of the information acquisition apparatus, when creating a communication document, the communication document creating means judges the information included in the summary information received by the summary information receiving means by the conditional expressions, selects a fixed-expression stored in the fixed-expression storing means, according to a result of the judgment, and inserts the fixed-expression into the communication document.

Besides, according to a fifth aspect of the information acquisition apparatus of the present invention, there is provided an information acquisition apparatus based on the fourth aspect of the information acquisition apparatus, wherein a fixed-expression to be stored in the fixed-expression storing means has an insertion portion into which a phrase can be inserted by the communication document creating means, and when creating a communication document, a phrase extracted from the summary information received by the summary information receiving means is inserted into the insertion portion of the fixed-expression.

In the fifth aspect of such an information acquisition apparatus of the present invention, in addition to the fourth aspect of the information acquisition apparatus, when creating a communication document, a phrase extracted from the summary information received by the summary information receiving means is inserted into the insertion portion of the fixed-expression.

Furthermore, according to a sixth aspect of the information acquisition apparatus of the present invention, there is provided an information acquisition apparatus based on the fifth aspect of the information acquisition apparatus, wherein the communication document creating means creates a communication document when the determining means determines that the document information corresponding to the received summary information is outside the validity period.

In the sixth aspect of such an information acquisition apparatus of the present invention, in addition to the fifth aspect of the information acquisition apparatus, the communication document creating means creates a communication document when the document information corresponding to the received summary information is outside the validity period.

According to a first aspect of the computer memory product of the present invention, there is provided a computer memory product storing a computer program for causing a computer to transmit and register document information into another computer, the computer program comprising the steps of causing a computer to create summary information including outline information containing a part of registered document information, location information indicating another computer in which the document information is to be registered and a registration location in the another computer, and registrant information showing information specifying an apparatus that registered the document information; and causing a computer to transmit the created summary information to other computer.

Moreover, according to a second aspect of the computer memory product of the present invention, there is provided a computer memory product based on the first aspect of the computer memory product, wherein the computer program further comprises the steps of: causing a computer to accept validity period information showing a time limit within which the registered document information is acquirable; and causing a computer to add the accepted validity period information to the summary information.

In the first and second aspects of the computer memory product of the present invention, when the computer program stored in the computer memory product is installed in a general-purpose computer, the computer functions as an information registration apparatus as described above.

Moreover, according to a third aspect of the computer memory product of the present invention, there is provided a computer memory product storing a computer program for causing a computer to receive and acquire document information, the computer program comprising the steps of: causing a computer to receive summary information including outline information containing a part of document information to be acquired, location information indicating an apparatus in which the document information is registered and a registration location in the apparatus, registrant information showing information specifying an apparatus that registered the document information, and validity period information showing a time limit within which the document information is acquirable; causing a computer to create a communication document to be transmitted to the apparatus that registered the document information corresponding to the received summary information; and causing a computer to transmit the created communication document, according to the registrant information included in the summary information corresponding to the communication document.

Furthermore, according to a fourth aspect of the computer memory product of the present invention, there is provided a computer memory product based on the third aspect of the computer memory product, wherein the computer program further comprises the step of causing a computer to determine, based on the validity period information included in the received summary information, whether or not the document information corresponding to the received summary information is acquirable.

In addition, according to a fifth aspect of the computer memory product of the present invention, there is provided a computer memory product based on the fourth aspect of the computer memory product, wherein the computer program further comprises the step of causing a computer to insert a fixed-expression into a communication document when creating the communication document.

Besides, according to a sixth aspect of the computer memory product of the present invention, there is provided a computer memory product based on the fifth aspect of the computer memory product, wherein the computer program further comprises the steps of: causing a computer to judge the information included in the received summary information by conditional expressions when creating a communication document; and causing a computer to select any of a plurality of fixed-expressions, according to a result of the judgment, and insert the selected fixed-expression into the communication document.

Moreover, according to a seventh aspect of the computer memory product of the present invention, there is provided a computer memory product based on the sixth aspect of the computer memory product, wherein the computer program further comprises the step of causing a computer to insert a phrase extracted from the received summary information into a predetermined portion of the fixed-expression when creating the communication document.

Furthermore, according to an eighth aspect of the computer memory product of the present invention, there is provided a computer memory product based on the seventh aspect of the computer memory product, wherein the computer program further comprises the step of causing a computer to create a communication document when it is determined that the document information corresponding to the received summary information is outside the validity period.

In the third through eighth aspects of the computer memory product of the present invention, when the computer program stored on the computer memory product is installed in a general-purpose computer, the computer functions as an information acquisition apparatus as described above.

The above and further objects and features of the invention will more fully be apparent from the following detailed description with accompanying drawings.

BRIEF DESCRIPTION OF THE SEVERAL VIEWS OF THE DRAWINGS

FIG. 6 is a schematic view showing an example of the structure of outline information in the summary information;

FIG. 13 is a schematic view showing an example of the content of a table pre-registered in a storing unit of the information acquisition apparatus of the present invention;

FIG. 14 is a schematic view showing one example of fixed-expression for use in the communication document creation process performed by the information acquisition apparatus of the present invention;

FIG. 16 is a schematic view showing the content of a program for the information registration apparatus of the present invention; and FIG. 17 is a schematic view showing the content of a program for the information acquisition apparatus of the present invention.

DETAILED DESCRIPTION OF THE PREFERRED EMBODIMENTS

Figure 1:
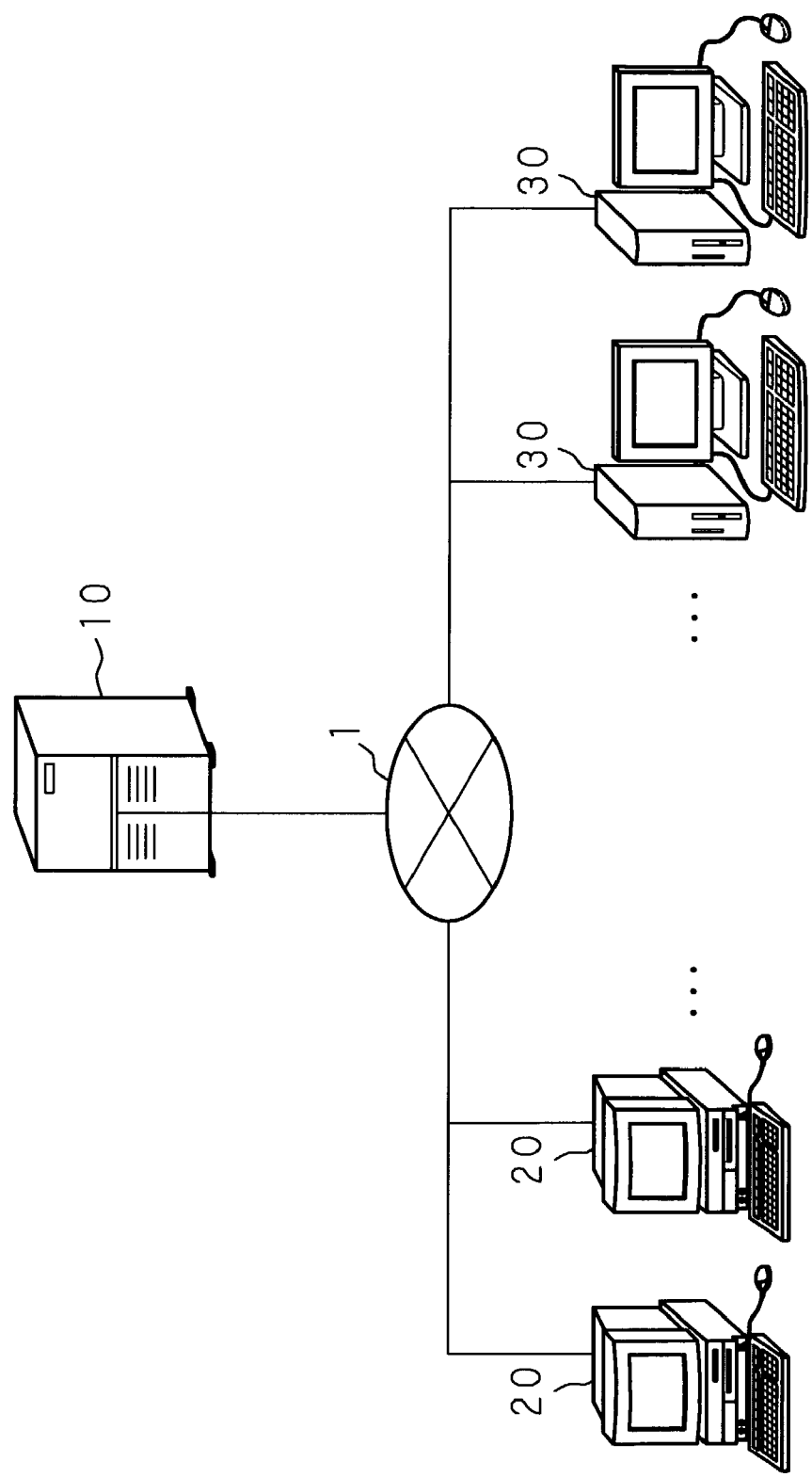
FIG. 1 is a schematic view showing a schematic construction example of an entire information processing system of the present invention.

The following description will explain the present invention in detail, based on the drawings illustrating some embodiments thereof. FIG. 1 is a schematic view showing a schematic construction example of an entire information processing system of the present invention.

In FIG. 1, reference numeral 10 indicates an information management apparatus using a server computer. This information management apparatus 10 is connected to a communication network 1 such as a LAN or the Internet, and performs the function of registering electronic document information (hereinafter simply referred to as the document information) in itself and distributing the registered document information.

Connected also to the communication network 1 are a plurality of information registration apparatus 20 each using client computer, for registering document information in the information management apparatus 10, and a plurality of information acquisition apparatus 30 each using client computer, for acquiring document information from the information management apparatus 10. It is needless to say that the information registration apparatus 20 may also have the function of the information acquisition apparatus 30, or the information acquisition apparatus 30 may also have the function of the information registration apparatus 20. It is also possible that there are only one information registration apparatus 20 and one information acquisition apparatus 30.

Figure 2:
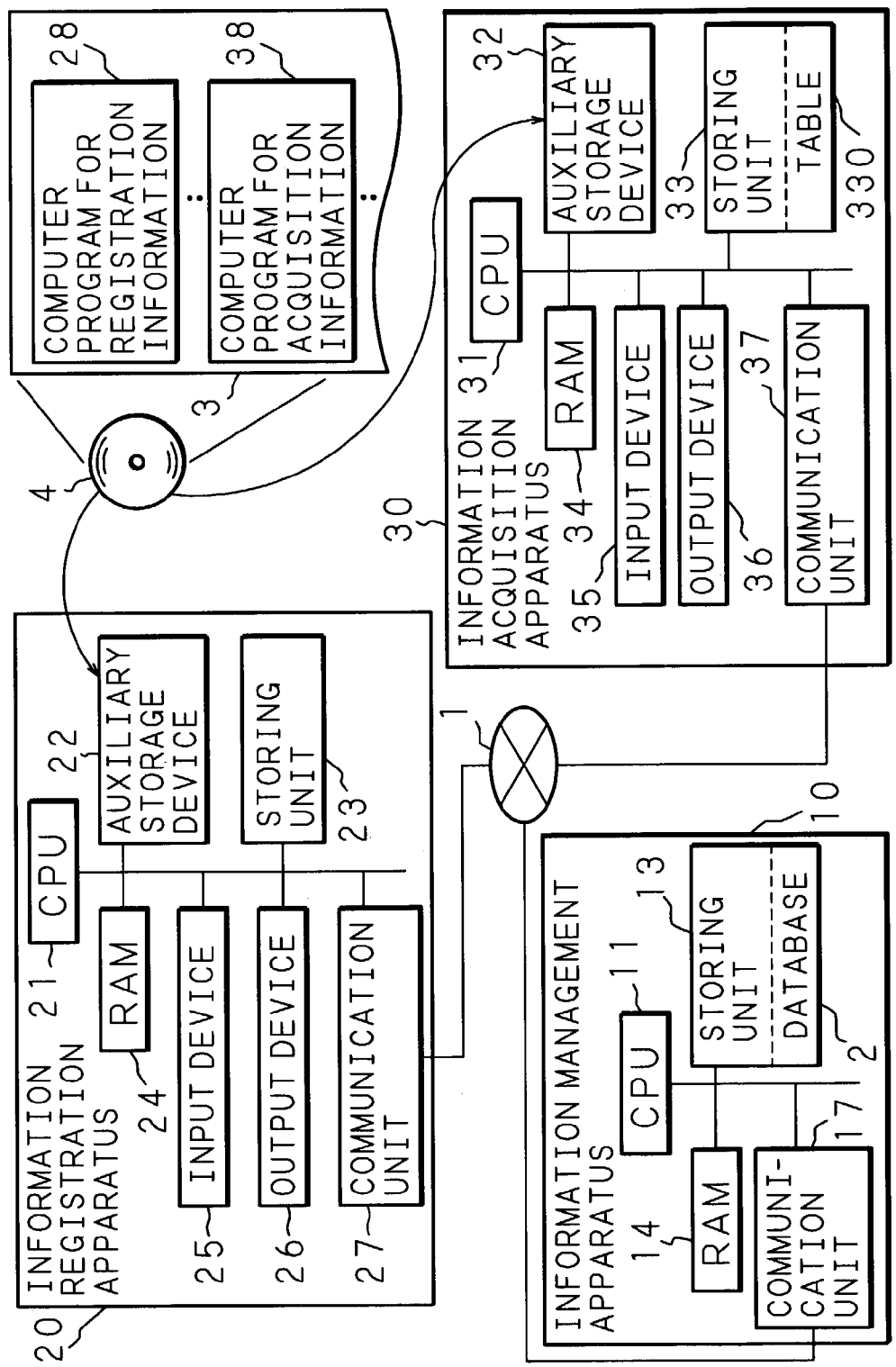
FIG. 2 is a block diagram showing a more specific construction example of an information management apparatus, information registration apparatus and information acquisition apparatus constituting the information processing system of the present invention.

FIG. 2 is a block diagram showing a more specific construction example of the information management apparatus 10, information registration apparatus 20 and information acquisition apparatus 30 constituting the information processing system of the present invention.

The information registration apparatus 20 (information acquisition apparatus 30) comprises: an auxiliary storage device 22 (32) such as a CD-ROM drive or an MO drive for reading various information from a removable medium (computer memory product) 4 such as a CD-ROM and an MO that stores various information such as a computer program 3 and data of the information processing system of the present invention; and a storing unit 23 (33) such as a hard disk or a memory card for storing various information read from the auxiliary storage device 22 (32).

Various information such as the computer program 3 and data is read from the storing unit 23 (33), and then the information is stored in a RAM 24 (34) for temporarily storing information. When a CPU 21 (31) executes the information stored in the RAM 24 (34), the client computer operates as the information registration apparatus 20 (information acquisition apparatus 30) of the present invention.

It is needless to say that the information registration apparatus 20 can read and execute only a computer program 28 for registration of information, and the information acquisition apparatus 30 can read and execute only a computer program 38 for acquisition of information.

Moreover, the storing unit 33 of the information acquisition apparatus 30 stores a later-described table 330 as shown in FIG. 13 in a suitable storage area, and functions as fixed-expression storing means and means for storing conditional expressions.

Furthermore, the information registration apparatus 20 (information acquisition apparatus 30) comprises an input device 25 (35) such as a mouse or a keyboard; an output device 26 (36) such as a monitor and a printer; and a communication unit 27 (37) such as a LAN board or a modem for connecting to the communication network 1.

Meanwhile, the information management apparatus 10 stores document information received from the information registration apparatus 20 through the communication network 1 temporarily in a RAM 14, and stores (registers) the document information in a database 2 allocated to a storage area of a storing unit 13, such as a hard disk or a RAID, by the processing of the CPU 11.

Figure 3:
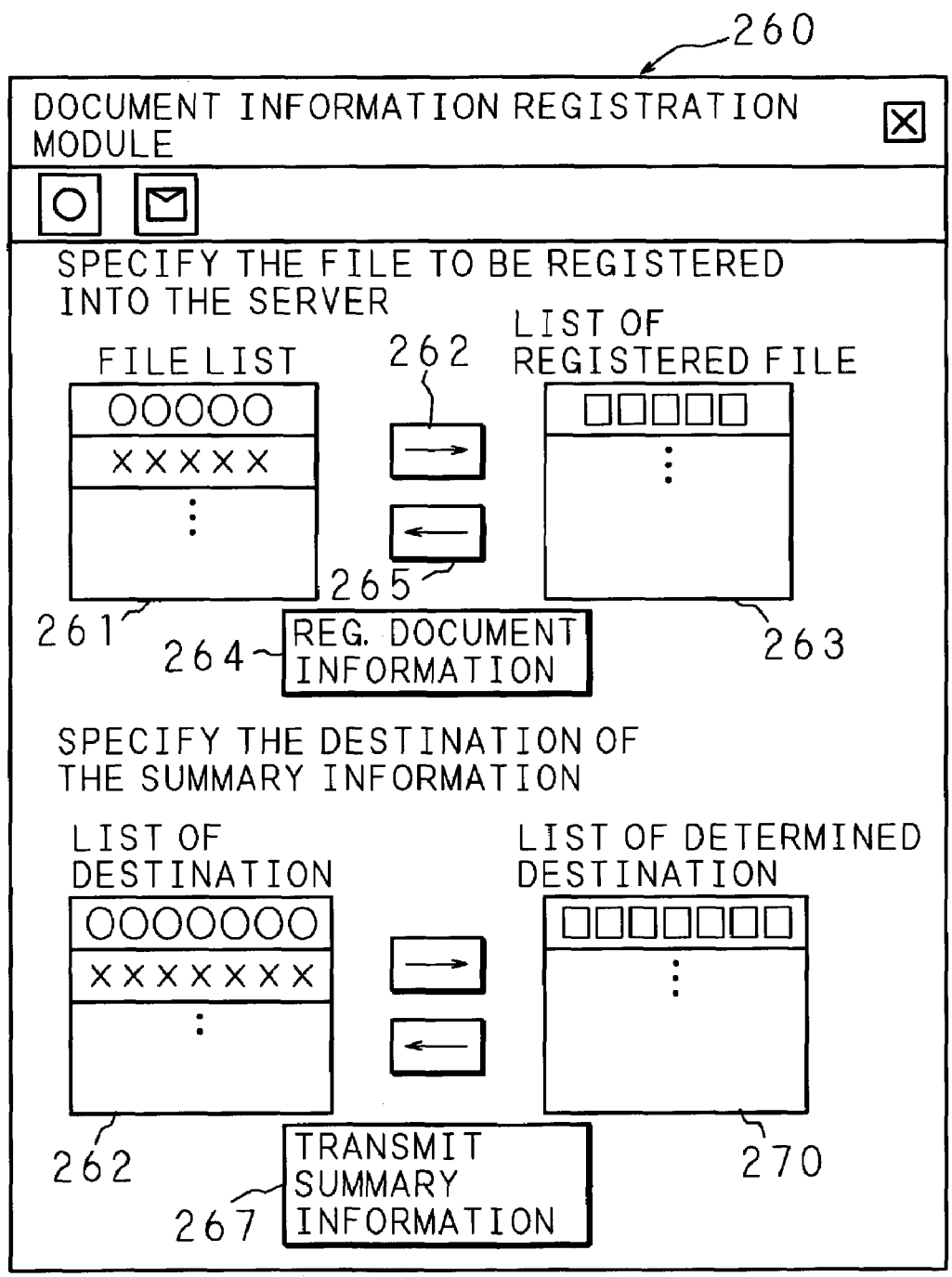
FIG. 3 is a schematic view showing an example of output to an output device when an information registration process is performed by the information registration apparatus of the present invention.

FIG. 3 is a schematic view showing an example of output to the output device 26 when an information registration process is performed by the information registration apparatus 20 of the present invention. Note that this example uses a monitor as the output device 26, and shows a display screen 260 of the monitor.

As shown in FIG. 3, an information registrant stores document information that he/she desires to register in the information management apparatus 10 in the information registration apparatus 20 beforehand, selects a piece of document information on a file list window 261 that displays a list of the document information by using a mouse serving as the input device 25, and then clicks a right arrow (→) button 262. Consequently, the selected document information is moved to a window 263 for a list of files registered in the server. In this state, when a document information registration button 264 is clicked with the mouse, the information registration apparatus 20 executes the process of registering the selected document information in the information management apparatus 10.

Note that, if a wrong file is selected, in the reverse order to the above operation, the document information is selected on the window 263 for a list of files registered in the server, and then a left arrow (←) button 265 is clicked with the mouse. Consequently, the document information selected on the window 263 for a list of files registered in the server is moved to the file list window 261 and restored.

With the above-mentioned operation of the information registration apparatus 20, the document information desired by the registrant is transmitted and registered into the information management apparatus 10. Since such a process is an ordinary process for client/server systems, the detailed explanation of the process will be omitted here.

Next, the registrant selects an opposite party to which summary information is to be sent, on a window 266 for a list of concerned destinations by an operation similar to the mentioned one, moves the selected opposite party to a window 270 for a list of determined destinations, and then clicks a summary information transmission button 267 with the mouse. Thus, the information registration apparatus 20 transmits the summary information to the opposite party selected on the window 266. Note that, for the individual destinations displayed on the window 266 for a list of concerned destinations, it is possible to use electronic mail addresses, or register electronic mail addresses in association with names such as names or nicknames (handle names), respectively, in advance and use the registered names as the destinations. In addition, it is also possible to directly input the electronic mail address of a destination that is not registered in the list of concerned destinations.

Needless to say, it is possible to select an opposite party to which document information and summary information to be registered are to be transmitted in advance, and then collectively perform the above-mentioned information registration process and summary information transmission process.

Figure 4:
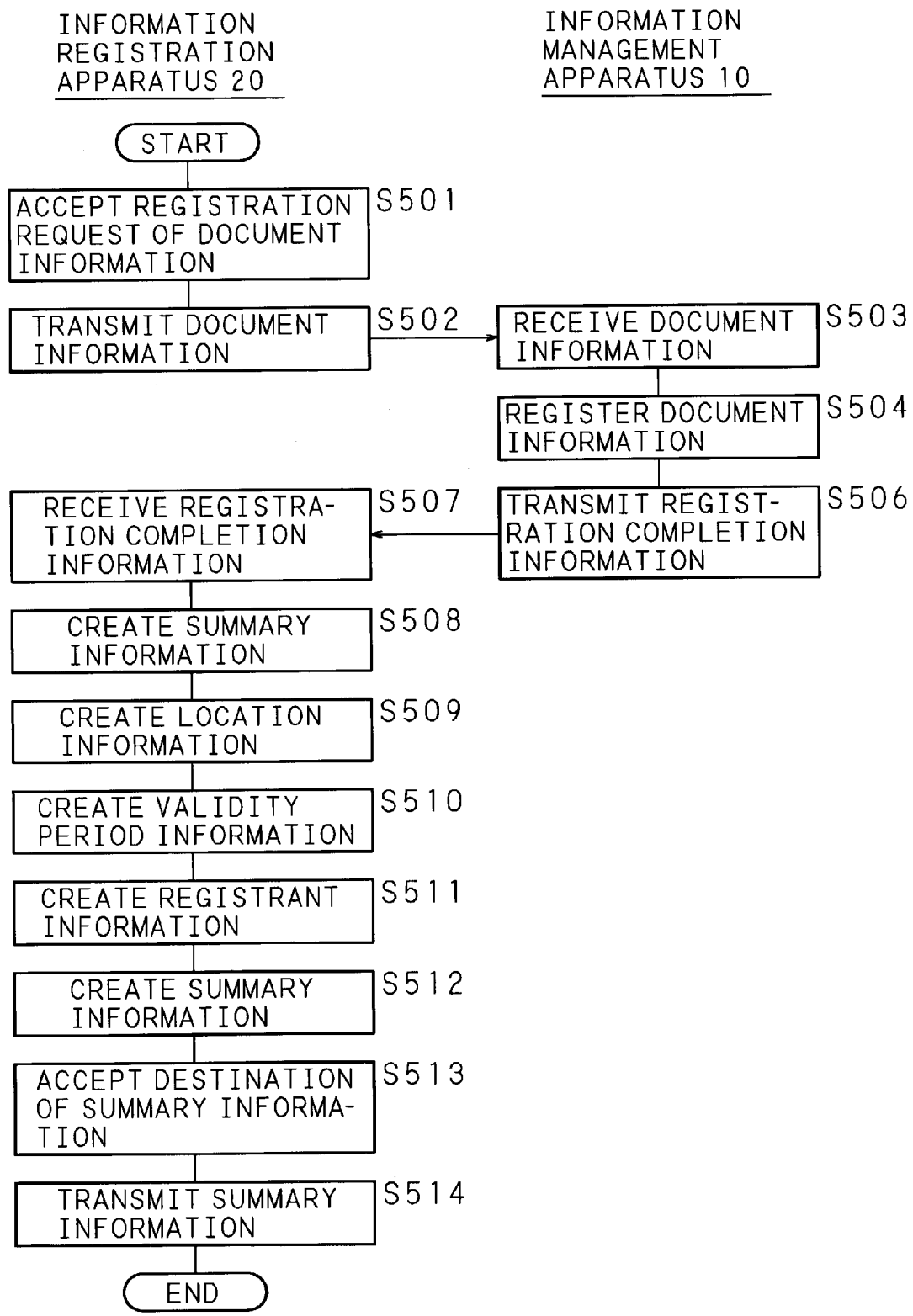
FIG. 4 is a flow chart showing the procedure of an information registration process and summary information creation process executed by the information registration apparatus of the present invention.
Figure 5:
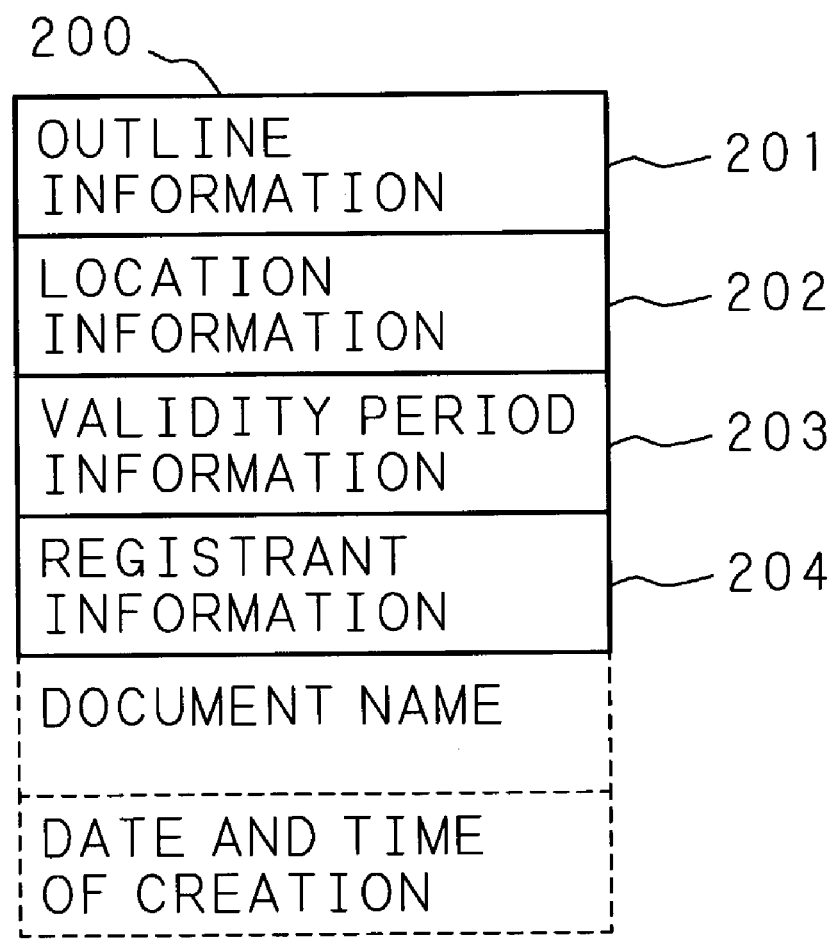
FIG. 5 is a schematic view showing the content of summary information created by the information registration apparatus of the present invention.

FIG. 4 is a flow chart showing the procedure of an information registration process and summary information creation process executed by the information registration apparatus 20 of the present invention. FIG. 5 is a schematic view showing the content of summary information 200 created by the information registration apparatus 20. Referring to FIG. 4 and FIG. 5, the following description will explain the information registration process and summary information creation process executed by the information registration apparatus 20 of the present invention.

By specifying document information to be registered in the information management apparatus 10 and clicking the document information registration button 264 as described above, the information registration apparatus 20 accepts a registration request of the document information to the information management apparatus 10 (S501), and transmits the document information to the information management apparatus 10 through the communication network 1 (S502).

Meanwhile, when the information management apparatus 10 receives the document information transmitted from the information registration apparatus 20 (S503), it registers the document information in the database 2 (S504). Then, when the registration of the document information is completed, the information management apparatus 10 transmits registration completion information to the information registration apparatus 20 through the communication network 1 (S506).

When the information registration apparatus 20 receives the registration completion information transmitted from the information management apparatus 10 (S507), it creates summary information 200 from the document information as the object registered beforehand in the information management apparatus 10. More specifically, the information registration apparatus 20 first creates outline information 201 for understanding of the outline of the document information (S508). Then, in order to enable access to the document information for which the outline information 201 is created, i.e., in order to permit the information acquisition apparatus 30 to acquire the document information, the information registration apparatus 20 creates information specifying the information management apparatus 10, and location information 202 specifying the registration location of the document information in the database 2 allocated to the storing unit 13 and its file name (S509).

FIG. 6 is a schematic view showing an example of the structure of the outline information 201 in the summary information 200 shown in FIG. 5. The outline information 210 will be explained in further detail. The outline information 201 is composed of information showing the total page number M and information about each page from the first page to the Mth page. The information about each page comprises data such as the number of objects constituting each page of document, the kind, position, size, and line width of each object. Accordingly, the recipient who received the summary information by the information acquisition apparatus 30 can understand the outline of the document information from the summary information, without viewing the document information itself.

Note that the summary information 200 may be any kind of information if it enables the recipient to understand the outline of the document information from the outline information 201. For example, the summary information 201 may be a thumbnail created by converting the contents of a predetermined number of pages from the top of the document information into an image, or a summary statement created by extracting a part of character strings contained in the document information or summarizing them.

Figure 7:
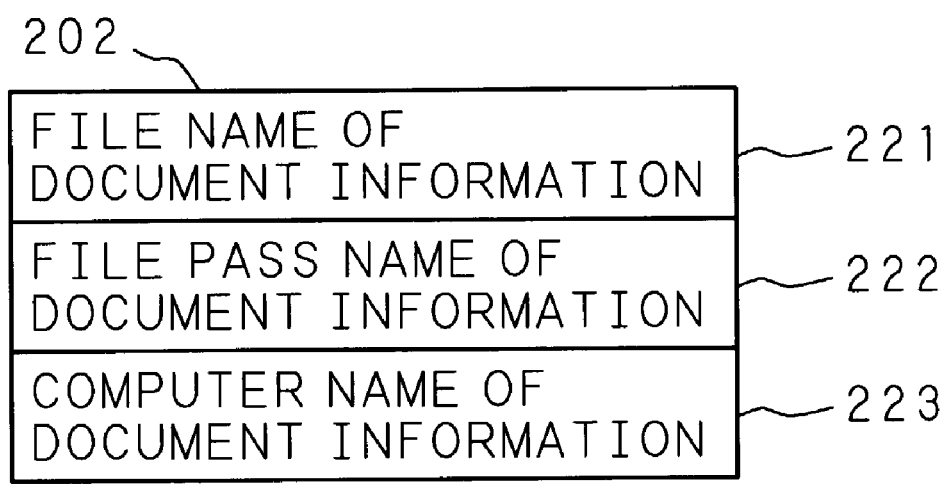
FIG. 7 is a schematic view showing an example of the structure of location information in the summary information.

FIG. 7 is a schematic view showing an example of the structure of the location information 202 in the summary information 20 shown in FIG. 5. The location information 202 will be explained in further detail. The location information 202 comprises a file name of an individual piece of document information, a file pass name 222 showing the registration location in the database 2, and a computer name 223 such as an IP address indicating a location on the network where the database 2 exists so that it is possible to specify where in the database 2 and under which name the document information is registered.

Accordingly, when the information acquisition apparatus 30 receives the summary information, the recipient logs in to the computer name 223 and specifies the file pass name 222 and file name 221 according to the above-mentioned location information 202, so that the document information can be acquired from the information management apparatus 10 by using a tool such as FTP (File Transfer Protocol).

Next, the information registration apparatus 20 creates validity period information 203 by calculating a time limit within which it is possible to access the document information registered in the information management apparatus 10, from the current date and time and a predetermined validity period (S510). Note that the validity period information 203 may be inputted directly by the sender with the use of the input device 25 of the information registration apparatus 20.

Subsequently, the information registration apparatus 20 creates registrant information 204 comprising a name or an address for specifying the registrant of the document information (S511), and then creates the summary information 200 of the document information by combining the outline information 201, location information 202, validity period information 203 and registrant information 204 together (S512).

In the above-described manner, the summary information 200 as shown in FIG. 5 is created. The structure of the summary information 200 will be explained in further detail. The summary information 200 comprises the outline information 201, location information 202, validity period information 203, registrant information 204, and the like. Furthermore, as shown by the dotted line, information such as the document name and the creation date and time may be added to the summary information 200. It is thus possible to understand the outline of the document information from the summary information 200 and specify the registrant of the document information.

Note that the registrant information 204 is not necessarily the information about a person who actually registered the document information, and may be the information of the creator or the manager of the document information, or a computer system capable of accepting communications such as an inquiry about the document information and replying to the inquiry.

Further, the information registration apparatus 20 accepts a destination of the above-created summary information 200 upon selection on the window 266 for a list of concerned destinations (S513). When a summary information transmission button 267 is clicked, the information registration apparatus 20 transmits the summary information 200 to the accepted destination through the communication network 1 by electronic mail or other means (S514). Here, needless to say, it is also possible to register the destination in the information registration apparatus 20 in advance and perform the creation and transmission of the summary information 200 collectively.

Figure 8:
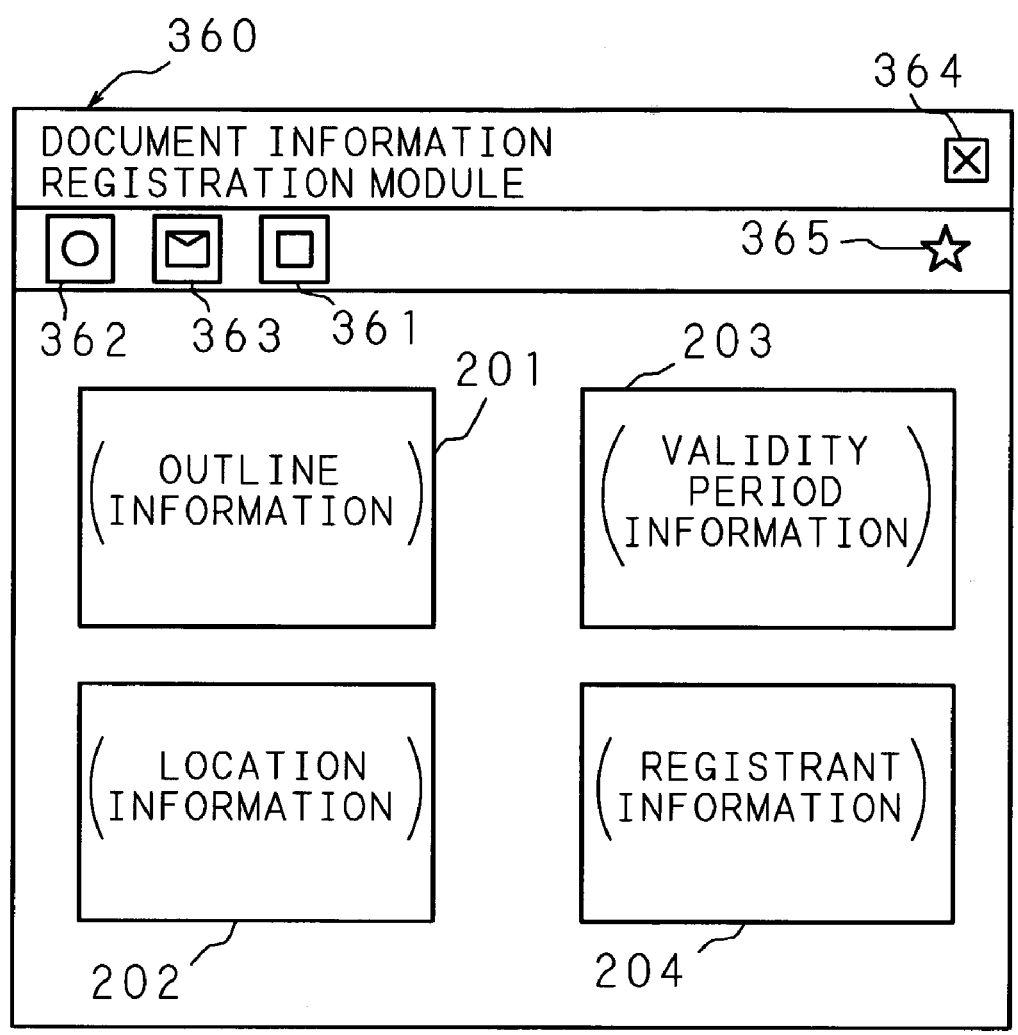
FIG. 8 is a schematic view showing a display example on the output device when an information acquisition process is performed by the information acquisition apparatus of the present invention.

FIG. 8 is a schematic view showing a display example on the output device 36 when an information acquisition process is performed by the information acquisition apparatus 30 of the present invention. Note that this example uses a monitor as the output device 36, and shows a display screen 360 of the monitor.

When a user who desires to acquire information receives the summary information 200, the outline information 201 of the summary information 200 is displayed, and therefore the user can understand the outline of the document information from the displayed content. Here, when a property display button 361 is clicked, as shown in FIG. 8, properties comprising the location information 202, validity period information 203 and registrant information 204 included in the summary information 200 are displayed together with the outline information 201.

In addition, when the user wishes to acquire necessary document information, a process for acquiring the corresponding document information is executed by the information acquisition apparatus 30 by clicking a document information acquisition button 362. Besides, when the recipient wishes to transmit a message such as electronic mail to the registrant of the document information, an electronic mail transmission form is displayed on a window by clicking a message transmission button 363. The recipient can contact the registrant by freely creating a massage on the window and transmitting the message.

Figure 9:
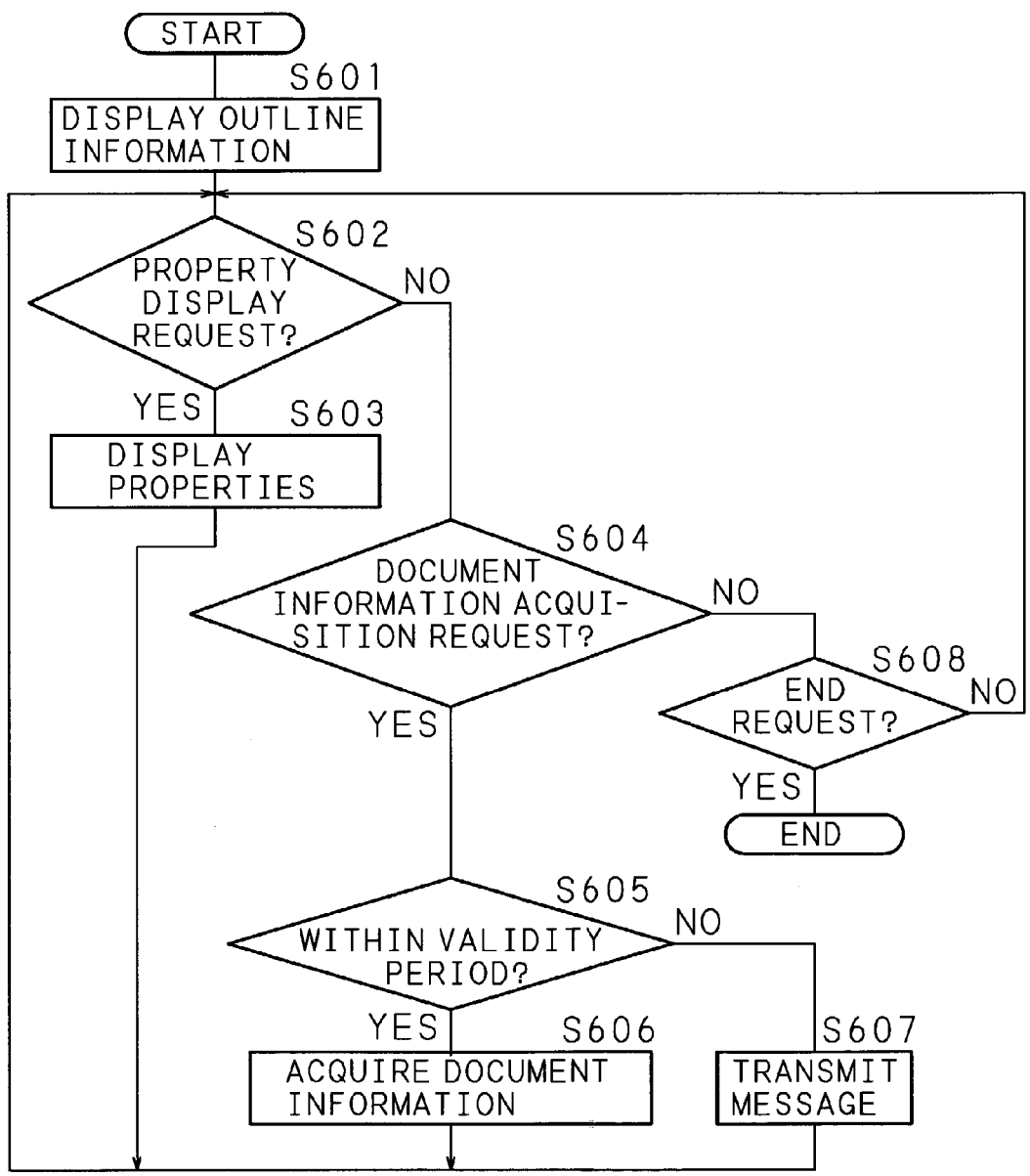
FIG. 9 is a flow chart showing the procedure of an information acquisition process and communication document creation process performed by the information acquisition apparatus of the present invention.

FIG. 9 is a flow chart showing the procedure of an information acquisition process and communication document creation process performed by the information acquisition apparatus 30 of the present invention.

First, the information acquisition apparatus 30 receives the summary information 200, extracts the outline information 201 from this summary information 200, and displays the outline information 201 on the screen 360 of the output device 36 such as a monitor (S601). Here, when the user wishes to know the properties comprising the location information 202, validity period information 203 and registrant information 204 included in the summary information 200, a property display request is given by clicking a property button 361 displayed on the screen 360 shown in FIG. 8 (YES in S602), and then the information acquisition apparatus 30 displays the properties of the summary information 200 on the screen 360 as shown in FIG. 8 (S603).

In addition, when the user desires to acquire the document information, a document information acquisition request is given by clicking a document information acquisition button 362 displayed on the screen 360 (YES in S604), and then the information acquisition apparatus 30 determines, based on the current date and time and the validity period information 203 included in the summary information 200, whether or not the desired document information is within the validity period (S605).

If it is determined that the desired document information is within the validity period (YES in S605), then the information acquisition apparatus 30 receives and acquires the document information for which the document information acquisition request was made in step S604 from the database 2 through the communication network 1 (S606). On the other hand, if it is determined that the desired document information is outside the validity period (NO in S605), since the information acquisition apparatus 30 can not access the document information for which the document information acquisition request was made in step S604, it automatically transmits an expiration message (communication document) to the information registrant of the document information by electronic mail, without acquiring the document information (S607).

Note that, when an end request is given by clicking an end button 364 displayed on the screen 360 shown in FIG. 8 (YES in S608), the information acquisition apparatus 30 ends the information acquisition process.

Figure 10:
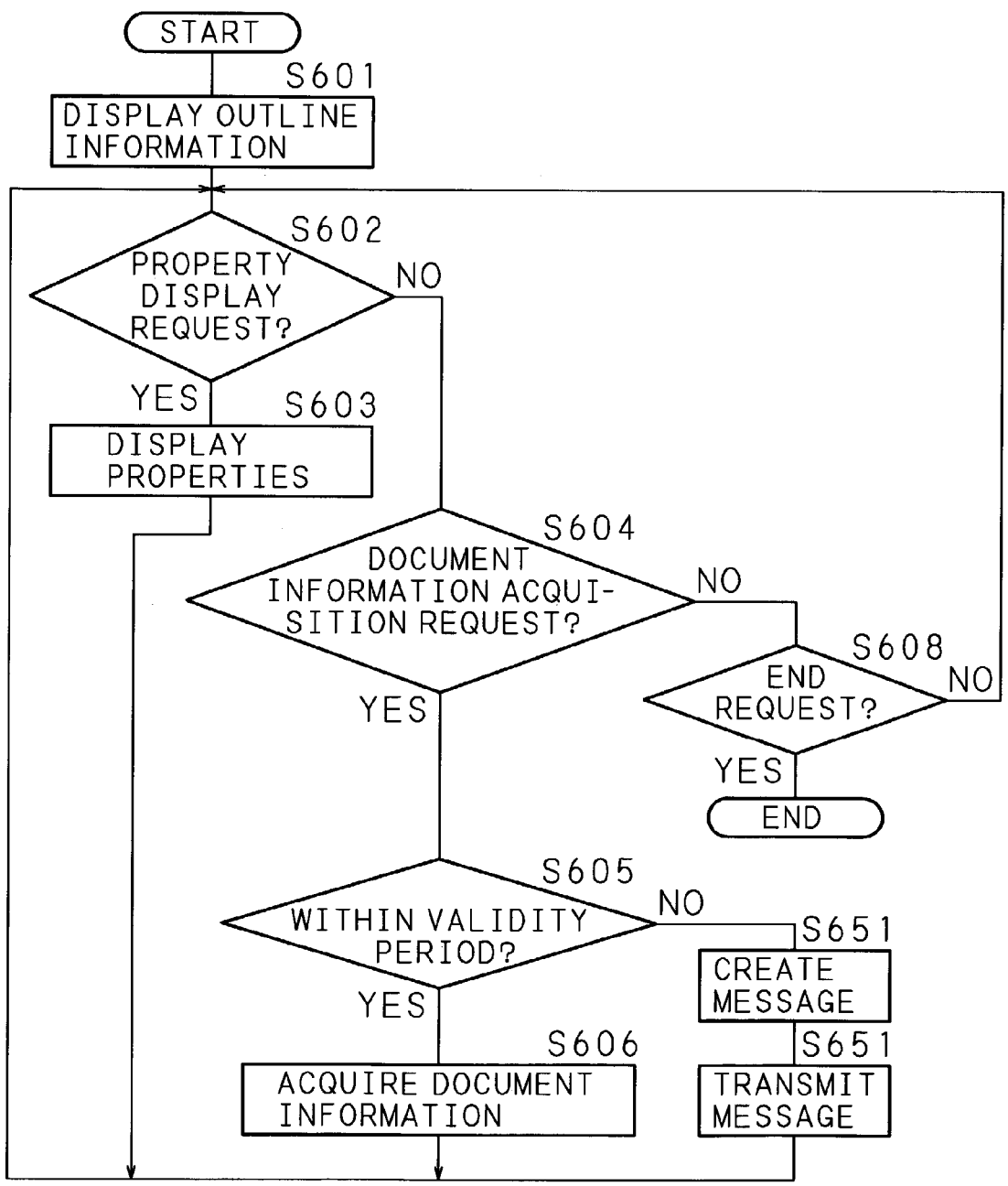
FIG. 10 is a flow chart showing the procedure of another information acquisition process and communication document creation process performed by the information acquisition apparatus of the present invention.

FIG. 10 is a flow chart showing the procedure of another information acquisition process and communication document creation process performed by the information acquisition apparatus 30 of the present invention. Here, since those designated with the same names and reference numerals as in the flow chart of FIG. 9 perform the same processing functions, an explanation thereof will be omitted here.

Like the flow chart of FIG. 9, when the information acquisition apparatus 30 requests acquisition of document information (YES in S604) and it is determined that the document information is outside the validity period (NO in S605), then, as shown in the flow chart of FIG. 10, the information acquisition apparatus 30 executes the communication document creation process to create a message (communication document) for the information registrant of the document information (S651).

In the communication document creation process of step S651, the information user freely writes greetings, a notification of expiration of the validity period of the document information, an inquiry about the document information, a document information acquisition request, etc. to the information registrant, and then transmits them by electronic mail or other means through the communication network 1 such as a LAN or the Internet (S652).

Figure 11:
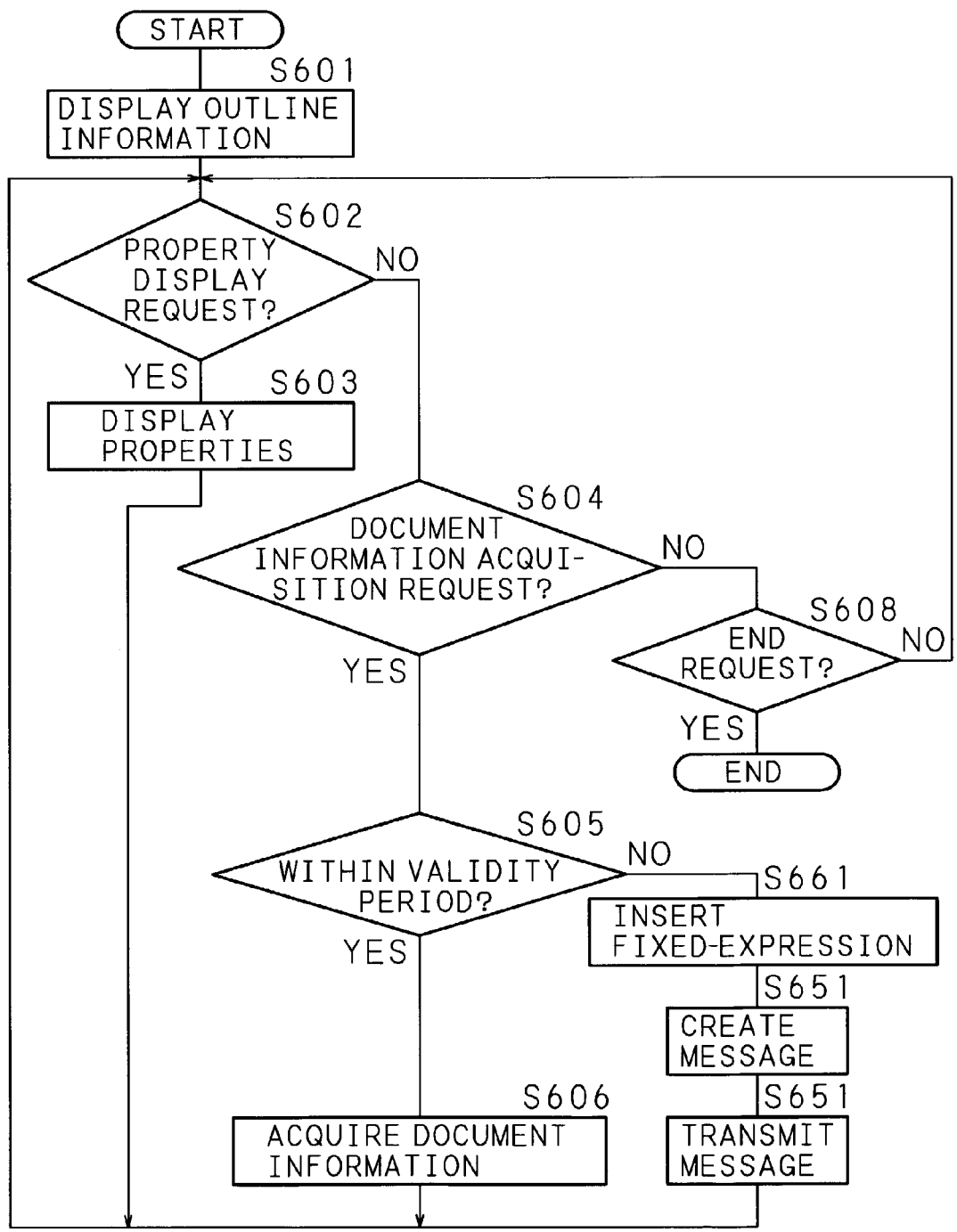
FIG. 11 is a flow chart showing the procedure of still another information acquisition process and communication document creation process performed by the information acquisition apparatus of the present invention.

FIG. 11 is a flow chart showing the procedure of still another information acquisition process and communication document creation process performed by the information acquisition apparatus 30 of the present invention. Here, since those designated with the same names and reference numerals as in the flow charts of FIG. 9 and FIG. 10 perform the same processing functions, an explanation thereof will be omitted here.

Like the flow charts of FIG. 9 and FIG. 10, when the information acquisition apparatus 30 requests acquisition of document information (YES in S604) and it is determined that the document information is outside the validity period (NO in S605), then the information acquisition apparatus 30 inserts fixed-expressions, such as greetings, a notification of expiration of the validity period of the document information and an acquisition request for the document information to the information registrant of document information, which are pre-stored in the table 330 of the storing unit 33, into a message (S661). Then, the document acquisition apparatus 30 executes the communication document creation process of creating the message to the information registrant of the document information (S651).

Here, the user confirms the message, eliminates or modifies the message, or adds individual matters to the message, and then transmits the resulting message by electronic mail or other means through the communication network 1 such as a LAN or the Internet (S652).

Figure 12:
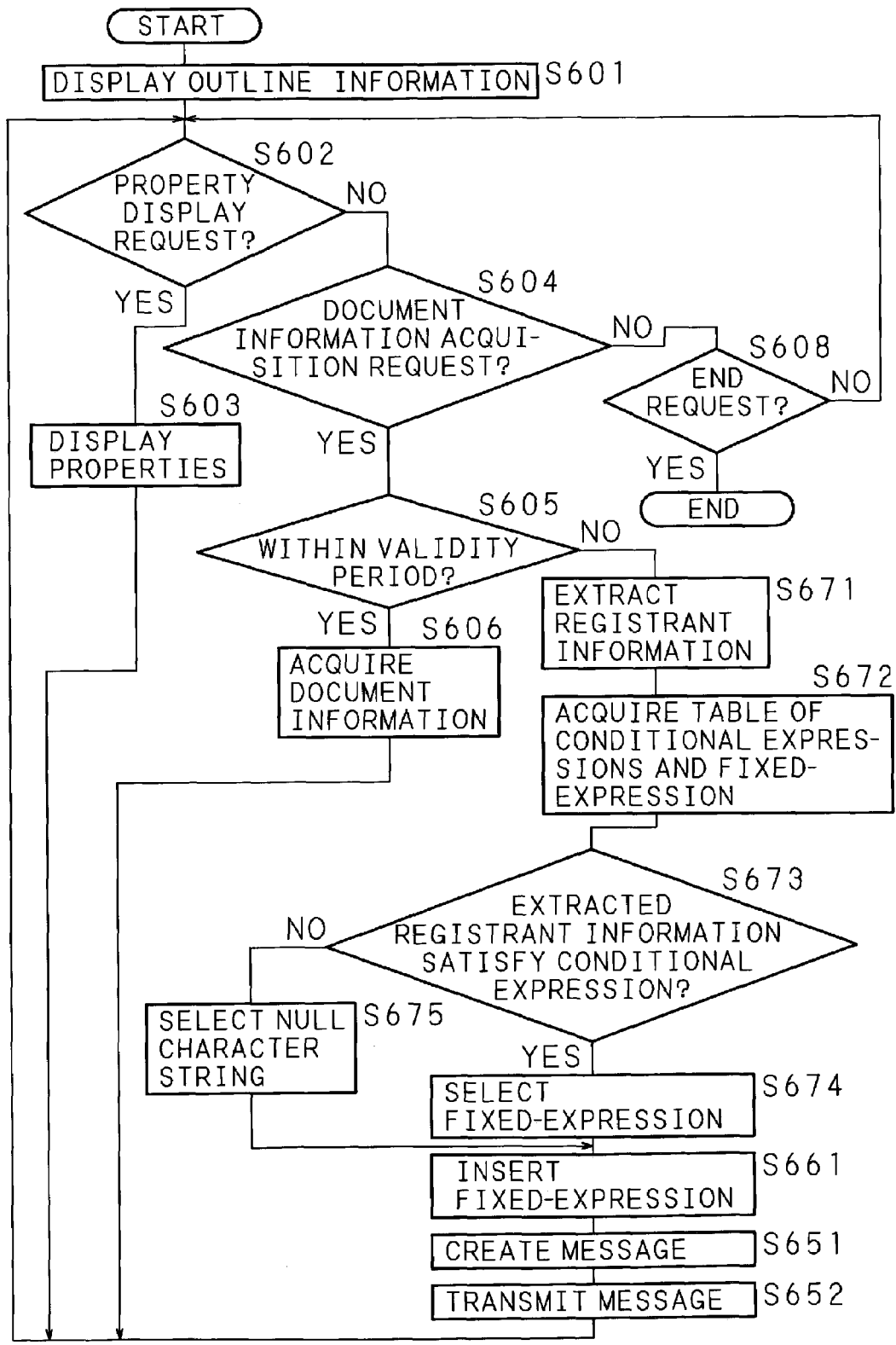
FIG. 12 is a flow chart showing the procedure of yet another information acquisition process and communication document creation process performed by another information acquisition apparatus of the present invention.

FIG. 12 is a flow chart showing the procedure of yet another information acquisition process and communication document creation process performed by another information acquisition apparatus 30 of the present invention. Here, since those designated with the same names and reference numerals as in the flow charts of FIG. 9, FIG. 10 and FIG. 11 perform the same processing functions, an explanation thereof will be omitted here.

As shown in the flow charts of FIG. 9, FIG. 10 and FIG. 11, when the information acquisition apparatus 30 requests acquisition of document information (YES in S604) and it is determined that the document information is outside the validity period (NO in S605), then the information acquisition apparatus 30 extracts the registrant information 204 of the document information from the summary information 200 (S671), and acquires the table 330 of the conditional expressions and fixed-expressions pre-stored in the storing unit 33 (S672). Then, the document registration apparatus 20 determines whether or not the extracted registrant information 204 satisfies a conditional expression (S673). If the extracted registrant information 204 satisfies a conditional expression (YES in S673), the document registration apparatus 20 selects a corresponding fixed-expression registered in the table (S674). On the other hand, if the extracted registrant information 204 does not satisfy a conditional expression (NO in S673), the document registration apparatus 20 selects a null character string as a fixed-expression (S675).

Next, the information acquisition apparatus 30 inserts into a message the selected fixed-expression (including the case where the fixed-expression is a null character string) (S661), and executes the communication document creation process for creating a message to the information registrant of the document information (S651). Here, the user confirms the message, eliminates or modifies the message, or adds individual matters to the message, and then transmits the resulting message by electronic mail or other means through the communication network 1 (S652).

FIG. 13 is a schematic view showing an example of the content of the table 330 pre-registered in the storing unit 33 of the information acquisition apparatus 30. In this example, the electronic mail address of each registrant is used as one example of conditional expression for use in determining a fixed-expression by the information acquisition apparatus 30, and fixed-expressions corresponding to the respective conditional expressions are pre-registered.

An electronic mail address is expressed in a hierarchical fashion such as using a country name, organization name, personal name, etc. Therefore, by employing all or a part of each electronic mail address as a condition, the fixed-expressions can be classified and managed separately according to each country, organization and individual person, thereby improving the efficiency of the process of creating a communication document for a document.

In the example shown in FIG. 13, when a registrant of document information has an electronic mail address including "*.co.jp", which means an enterprise organization in Japan, in the domain portion, a fixed-expression 1 corresponding to this is selected. Moreover, for example, when a registrant has "*@xy.co.jp" in an electronic mail address, since it is found that the registrant of the document information belongs to the "XY Company", a fixed-expression 2 corresponding to this is selected. Further, for example, when the electronic mail address of a registrant is "yamada@abcprovider.or.jp", since it is found that the registrant of the document information is Mr. Yamada belonging to the "ABC Provider", a fixed-expression 3 corresponding to this is selected.

FIG. 14 is a schematic view showing one example of fixed-expression for use in the communication document creation process performed by the information acquisition apparatus 30 of the present invention.

In FIG. 14, the portions within "{ }" are insertion portions into which phrases acquired from the summary information 200 can be inserted. "Registrant" is the registrant of the document information, "document name" is the name of the document information, and "validity period" is the validity period (such as year, month and day, or date and time) of the document information. The information acquisition apparatus 30 automatically creates a fixed-expression by extracting phrases as mentioned above from the summary information 200 and inserting the phrases into the insertion portions.

Figure 15:
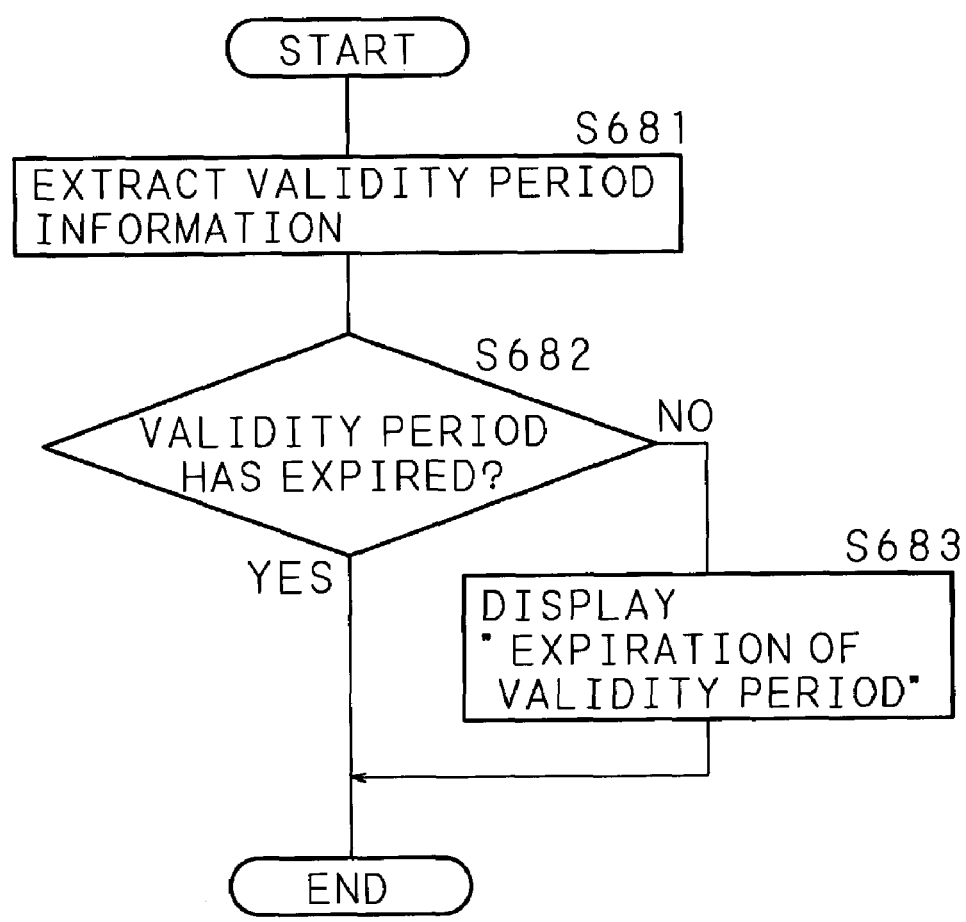
FIG. 15 is a flow chart showing the processing procedure for displaying expiration of the validity period of document information by the information acquisition apparatus of the present invention.

FIG. 15 is a flow chart showing the processing procedure for displaying expiration of the validity period of the document information by the information acquisition apparatus 30 of the present invention.

As shown in the flow chart of FIG. 15, when the information acquisition apparatus 30 receives the summary information 200, it extracts the validity period information 203 from the summary information 200 (S681), and compares the validity period information 203 with the current date and time so as to determine whether or not the validity period has expired (S682).

If it is determined that the current date and time are outside the validity period (NO in S682), the information acquisition apparatus 30 displays expiration of the validity period by the output device 36 (S683). For example, as shown in FIG. 8, an expiration mark 365, such as an asterisk, is displayed on the screen 360 of the monitor functioning as the output device 36 of the information acquisition apparatus 30.

FIG. 16 is a schematic view showing the content of a program 28 for the information registration apparatus 20 of the present invention. Note that the program 28 is recorded in the recording medium (computer memory product) 4 shown in FIG. 2.

The program 28 is a computer program for the information registration apparatus 20 to transmit and register document information into another computer, and comprises "a process (P11) of causing a computer to create summary information including outline information containing a part of registered document information, location information indicating another computer in which the document information is to be registered and the registration location in this computer, and registrant information showing information specifying an apparatus that registered the document information"; "a process (P12) of causing a computer to transmit the created summary information to other computer"; "a process (P13) of causing a computer to accept validity period information showing a time limit within which the registered document information is acquirable"; and "a process (P14) of causing a computer to add the accepted validity period information to the summary information".

FIG. 17 is a schematic view showing the content of a program 38 for the information acquisition apparatus 30 of the present invention. Note that the program 38 is recorded in the recording medium (computer memory product) 4 shown in FIG. 2.

The program 38 is a computer program for the information acquisition apparatus 30 to receive and acquir document information, and comprises "a process (P21) of causing a computer to receive summary information including outline information containing a part of document information to be acquired, location information indicating an apparatus in which the document information is registered and the registration location in the apparatus, registrant information showing information specifying an apparatus that registered the document information, and validity period information showing a time limit within which the document information is acquirable"; "a process (P22) of causing a computer to create a communication document to be transmitted to the apparatus that registered the document information corresponding to the received summary information"; "a process (P23) of causing a computer to transmit the created communication document, according to registrant information included in the summary information corresponding to the communication document"; "a process (P24) of causing a computer to determine, based on the validity period information included in the received summary information, whether or not the document information corresponding to the received summary information is acquirable"; "a process (P25) of causing a computer to insert a fixed-expression into a communication document when creating the communication document"; "a process (P26) of causing a computer to judge the information included in the received summary information by conditional expressions when creating the communication document"; "a process (P27) of causing a computer to select any of a plurality of fixed-expressions according to a result of the judgment and insert the selected fixed-expression into the communication document"; "a process (P28) of causing a computer to insert a phrase extracted from the received summary information into a predetermined portion when creating the communication document"; and "a process (P29) of causing a computer to create a communication document when it is determined that the document information corresponding to the received summary information is outside the validity period".

Note that the program 38 can cause a computer to selectively execute any of "a process (P25) of causing a computer to insert a fixed-expression into a communication document when creating the communication document", "a process (P26) of causing a computer to judge the information included in the received summary information by conditional expressions when creating the communication document", and "a process (P27) of causing a computer to select any of a plurality of fixed-expressions according to a result of the judgment and insert the selected fixed-expression into the communication document".

Furthermore, the program 38 can also cause a computer to selectively execute "a process (P28) of causing a computer to insert a phrase extracted from the received summary information into a predetermined portion when creating the communication document". In addition, the program 38 can also cause a computer to selectively execute either "a process (P22) of causing a computer to create a communication document to be transmitted to the apparatus that registered the document information corresponding to the received summary information", or "a process (P29) of causing a computer to create a communication document when it is determined that the document information corresponding to the received summary information is outside the validity period".

As described in detail above, according to the information processing method and system of the present invention, the information registration apparatus registers document information in the information management apparatus, and further creates summary information of the registered document information. Accordingly, since the information management apparatus does not need to perform the process of creating the summary information, the processing load on the information management apparatus is reduced.

Moreover, according to the information processing method and system of the present invention, the summary information includes outline information showing an outline of the content of the document information. Therefore, the user of the information acquisition apparatus that received the summary information can understand the outline of the document information, without directly accessing the document information registered in the document management apparatus. Therefore, the user of the information acquisition apparatus can promptly contact the information registrant of the document information by FTP or electronic mail, based on the registrant information included in the summary information, if necessary. Furthermore, the information registrant who received the communication document can reply to the user.

Besides, according to the information processing method and system of the present invention, the validity period information included in the summary information shows a time limit within which the document information is acquirable from the information management apparatus. Therefore, the user of the information acquisition apparatus that received the summary information can know whether or not it is possible to access the document information registered in the information management apparatus, without actually accessing the document information. Then, if the document information is within the validity period, the user can acquire the document information from the information management apparatus, according to the location information included in the summary information. On the other hand, if the document information is outside the validity period, the user can create a communication document and transmit it to the information registration apparatus of the information registrant, without acquiring the document information.

Furthermore, according to the information processing method and system of the present invention, since the communication document is created and transmitted to the information registrant of the document information only when it is determined that validity period of the document information has expired, the creation and transmission of a communication document are not performed for document information determined that its validity period has not expired, i.e., document information that is acquirable from the information management apparatus, and consequently the traffic volume in the communication network is reduced.

Additionally, according to the information processing system of the present invention, since a pre-stored fixed-expression is automatically inserted into a communication document when creating the communication document in the information acquisition apparatus, the user of the information acquisition apparatus can save time and effort.

Moreover, according to the information processing system of the present invention, when creating the communication document by the information acquisition apparatus, the information included in the received summary information is judged by conditional expressions stored in advance, and a fixed-expression is selected according to a result of the judgment and inserted into the communication document. Thus, since a communication document according to a destination, for example, is automatically created, the user of the information acquisition apparatus can save time and effort.

Furthermore, according to the information processing system of the present invention, when creating the communication document by the information acquisition apparatus, a phrase extracted from the received summary information is inserted into an insertion portion of the fixed-expression. Thus, since the communication document is created by automatically inserting different information (such as document name, registrant name, and validity period) according to the destination, for example, the user of the information acquisition apparatus can save time and effort.

According to the information registration apparatus of the present invention, since summary information, including outline information containing a part of document information registered in an information management apparatus, location information indicating the information management apparatus in which the document information is registered and the registration location in the information management apparatus, and registrant information specifying itself, is automatically created and transmitted, the user of the information registration apparatus (information registrant) can save time and effort for creating and transmitting the summary information.

Besides, according to the information registration apparatus of the present invention, since the information registration apparatus accepts validity period information showing a time limit within which the document information registered in the information management apparatus is acquirable and automatically adds it to the summary information, the user of the information acquisition apparatus that received the summary information can know whether or not it is possible to access the document information registered in the information management apparatus, without actually accessing the document information.

According to the information acquisition apparatus of the present invention, the received summary information includes outline information showing an outline of the content of the document information. Therefore, the user of the information acquisition apparatus that received the summary information can understand the outline of the document information, without directly accessing the document information registered in the document management apparatus. Accordingly, the user of the information acquisition apparatus can promptly contact the information registrant of the document information by FTP or electronic mail, based on the registrant information included in the summary information, if necessary. Furthermore, the information registrant who received the communication document can reply to the user.

In addition, according to the information acquisition apparatus of the present invention, the validity period information included in the received summary information shows a time limit within which the document information is acquirable from the information management apparatus. Accordingly, the user of the information acquisition apparatus that received the summary information can know whether or not it is possible to access the document information registered in the information management apparatus, without actually accessing the document information. Then, if the document information is within the validity period, the user can acquire the document information from the information management apparatus according to the location information included in the summary information. On the other hand, if the document information is outside the validity period, the user can create a communication document and transmit the communication document to the information registration apparatus of the information registrant, without acquiring the document information.

Besides, according to the information acquisition apparatus, since a pre-stored fixed-expression is automatically inserted into a communication document when creating the communication document, the user of the information acquisition apparatus can save time and effort.

Moreover, according to the information acquisition apparatus of the present invention, when creating the communication document, the information included in the received summary information is judged by conditional expressions stored in advance, and a fixed-expression is selected, according to a result of the judgment, and inserted into the communication document. Thus, since a communication document according to a destination, for example, is automatically created, the user of the information acquisition apparatus can save time and effort.

Furthermore, according to the information acquisition apparatus of the present invention, when creating the communication document, a phrase extracted from the received summary information is inserted into an insertion portion of the fixed-expression. Thus, since the communication document is created by automatically inserting different information (such as document name, registrant name, and validity period) according to the destination, for example, the user of the information acquisition apparatus can save time and effort.

In addition, according to the information acquisition apparatus of the present invention, since a communication document is created and transmitted to the information registrant of the document information only when it is determined that the validity period of the document information has expired, the creation and transmission of a communication document are not performed for document information determined that its validity period has not expired, i.e., document information that is acquirable from the information management apparatus, and consequently the traffic volume in the communication network is reduced.

Besides, with a computer memory product of the present invention, it is possible to allow a general-purpose computer to operate as the above-described information registration apparatus of the present invention by causing the computer to read a computer program stored on the computer memory product.

Further, with the computer memory product of the present invention, it is possible to allow a general-purpose computer to operate as the above-described information acquisition apparatus of the present invention by causing the computer to read a computer program stored on the computer memory product.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing method for allowing an information acquisition apparatus to make a transmitting request for document information which is transmitted from an information registration apparatus and is registered in an information management apparatus, and for allowing the information acquisition apparatus to receive and acquire the document information transmitted from the information management apparatus upon the transmitting request, the method comprising:
  creating, by said information registration apparatus, summary information including outline information containing a part of document information registered in the information management apparatus, location information indicating the information management apparatus in which said document information is registered and a registration location in said information management apparatus, and registrant information specifying itself;
  transmitting, by said information registration apparatus, the summary information to said information acquisition apparatus;
  receiving, by said information acquisition apparatus, the summary information from the information registration apparatus;
  creating, by said information acquisition apparatus, a communication document containing a message to communicate with a registrant of document information, the document information being accessible in accordance with the location information included in the received summary information; and
  transmitting, by said information acquisition apparatus, the created communication document according to the registrant information included in the summary information corresponding to the communication document.

2. The information processing method as set forth in claim 1, further comprising the steps of:
  accepting, by said information registration apparatus, validity period information showing a time limit within which the document information registered in said information management apparatus is acquirable;
  adding, by said information registration apparatus, the accepted validity period information to the summary information; and
  determining, by said information acquisition apparatus, based on the validity period information included in the summary information received from said information registration apparatus, whether or not the document information is acquirable from said information management apparatus.

3. The information processing method as set forth in claim 2, further comprising the step of creating and transmitting, by said information acquisition apparatus, a communication document when it is determined that the document information corresponding to the received summary information is outside the validity period.

4. An information processing system for allowing an information acquisition apparatus to make a transmitting request for document information which is transmitted from an information registration apparatus and is registered in an information management apparatus, and for allowing the information acquisition apparatus to receive and acquire the document information transmitted from the information management apparatus upon the transmitting request, wherein
  said information registration apparatus comprises: summary information creating means for creating summary information including outline information containing a part of document information registered in the information management apparatus, location information indicating the information management apparatus in which the document information is registered and a registration location in the information management apparatus, and registrant information specifying itself; and summary information transmitting means for transmitting the summary information created by said summary information creating means to the information acquisition apparatus, and
  said information acquisition apparatus comprises: summary information receiving means for receiving the summary information from the information registration apparatus;
  communication document creating means for creating a communication document containing a message to communicate with a registrant of document information, the document information being accessible in accordance with the location information included in the received summary information; and communication document transmitting means for transmitting the communication document created by said communication document creating means, according to the registrant information included in the summary information corresponding to the communication document.

5. The information processing system as set forth in claim 4, wherein said information registration apparatus further comprises means for accepting validity period information showing a time limit within which the document information registered in said information management apparatus is acquirable,
  said summary information creating means further comprises means for adding the accepted validity period information to the summary information, and
  said information acquisition apparatus further comprises determining means for determining, based on the validity period information included in the summary information received by said summary information receiving means, whether or not the document information is acquirable from said information management apparatus.

6. The information processing system as set forth in claim 5, wherein said information acquisition apparatus further comprises fixed-expression storing means for storing fixed-expressions, and
  when creating a communication document, said communication document creating means inserts a fixed-expression stored in said fixed-expression storing means into the communication document.

7. The information processing system as set forth in claim 6, wherein
  said information acquisition apparatus further comprises means for storing conditional expressions, and
  when creating a communication document, said communication document creating means judges the information included in the summary information received by said summary information receiving means by the conditional expressions, selects a fixed-expression stored in said fixed-expression storing means, according to a result of the judgment, and inserts the fixed-expression into the communication document.

8. The information processing system as set forth in claim 7, wherein
- a fixed-expression to be stored in said fixed-expression storing means has an insertion portion into which a phrase can be inserted by said communication document creating means, and
- when creating a communication document, said communication document creating means inserts a phrase extracted from the summary information received by said summary information receiving means into said insertion portion of the fixed-expression.

9. The information processing system as set forth in claim 8, wherein said communication document creating means creates a communication document when said determining means determines that the document information corresponding to the received summary information is outside the validity period.

10. An information processing system for allowing an information acquisition apparatus to make a transmitting request for document information which is transmitted from an information registration apparatus and is registered in an information management apparatus, and for allowing the information acquisition apparatus to receive and acquire the document information transmitted from the information management apparatus upon the transmitting request,
- said information registration apparatus comprising a processor capable of performing the operations of:
- creating summary information including outline information containing a part of document information registered in the information management apparatus, location information indicating the information management apparatus in which the document information is registered and a registration location in the information management apparatus, and registrant information specifying itself; and
- transmitting the created summary information to the information acquisition apparatus, and
- said information acquisition apparatus comprising a processor capable of performing the operations of:
- receiving the summary information from the information registration apparatus;
- creating a communication document containing a message to communicate with a registrant of document information, the document information being accessible in accordance with the location information included in the received summary information; and
- transmitting the created communication document, according to the registrant information included in the summary information corresponding to the communication document.

11. The information processing system as set forth in claim 10, wherein
the processor of said information registration apparatus is further capable of performing the operations of:
- accepting validity period information showing a time limit within which the document information registered in said information management apparatus is acquirable; and
- adding the accepted validity period information to the summary information at said operation of creating the summary information; and
- the processor of said information acquisition apparatus is further capable of performing the operation of determining, based on the validity period information included in the received summary information, whether or not the document information is acquirable from said information management apparatus.

12. The information processing system as set forth in claim 11, wherein
the processor of said information acquisition apparatus is further capable of performing the operations of:
storing fixed-expressions; and
inserting a stored fixed-expression into a communication document at said operation of creating the communication document.

13. The information processing system as set forth in claim 12, wherein
the processor of said information acquisition apparatus is further capable of performing the operations of:
storing conditional expressions; and
judging the information included in the received summary information by the conditional expressions, selecting a stored fixed-expression, according to a result of the judgment, and inserting the fixed-expression into a communication document at said operation of creating the communication document.

14. The information processing system as set forth in claim 13, wherein
- a fixed-expression to be stored at said operation of storing fixed-expressions has an insertion portion into which a phrase can be inserted by said operation of creating the communication document, and
- the processor of said information acquisition apparatus is further capable of performing the operation of inserting a phrase extracted from the received summary information into said insertion portion of the fixed-expression at said operation of creating the communication document.

15. The information processing system as set forth in claim 14, wherein the processor of said information acquisition apparatus is further capable of performing the operation of creating a communication document when it is determined that said document information corresponding to the received summary information is outside the validity period at said operation of creating the communication document.

* * * * *